(12) United States Patent
McEwan (10) Patent No.: US 7,446,695 B2
(45) Date of Patent: Nov. 4, 2008

(54) PRECISION PULSE DETECTION SYSTEM FOR RADAR SENSORS

(76) Inventor: Thomas Edward McEwan, 8708 W. Gilmore, Las Vegas, NV (US) 89129

( * ) Notice: Subject to any disclaimer, the term of this patent is extended or adjusted under 35 U.S.C. 154(b) by 0 days.

(21) Appl. No.: 11/507,885

(22) Filed: Aug. 22, 2006

(65) Prior Publication Data

US 2008/0048905 A1 Feb. 28, 2008

(51) Int. Cl.
*G01S 7/285* (2006.01)
*G01S 7/28* (2006.01)
*G01S 13/10* (2006.01)
*G01S 13/00* (2006.01)

(52) U.S. Cl. ............................ 342/21; 342/27; 342/89; 342/118; 342/124; 342/134; 342/135; 342/175; 342/195; 375/256; 375/316; 375/320; 375/340; 329/311; 329/347; 73/290 R; 73/304 R; 324/629; 324/637; 324/642; 324/644

(58) Field of Classification Search .................. 342/21, 342/22, 82–103, 175, 195, 118–125, 134–145, 342/27, 28; 329/300–303, 311–314, 347, 329/358–362; 375/237–239, 242–254, 256, 375/259, 268–270, 316, 320, 321, 338, 339–343, 375/353, 130–153, 271–278, 322–328; 367/87, 367/99–116; 73/649, 658, 660, 290 R, 304 R, 73/304 C, 305, 290 B, 290 V; 368/89, 107–123; 324/629, 637, 638, 642, 644
See application file for complete search history.

(56) References Cited

U.S. PATENT DOCUMENTS

| 3,794,996 | A | * | 2/1974 | Robbins et al. | 342/21 |
| 3,971,990 | A | * | 7/1976 | Ross | 375/256 |
| 4,561,098 | A | * | 12/1985 | van Tol | 375/276 |
| 4,573,358 | A | * | 3/1986 | Luongo | 73/660 |
| 5,241,515 | A | * | 8/1993 | Harms et al. | 367/105 |
| 5,367,538 | A | * | 11/1994 | LaRosa et al. | 375/328 |
| 5,901,172 | A | * | 5/1999 | Fontana et al. | 375/130 |

* cited by examiner

*Primary Examiner*—Bernarr E Gregory (57) ABSTRACT

A precision pulse detection system for time-of-flight sensors detects a zero axis crossing of a pulse after it crosses above and then falls below a threshold. Transmit and receive pulses flow through a common expanded-time receiver path to precision transmit and receive pulse detectors in a differential configuration. The detectors trigger on zero axis crossings that occur immediately after pulse lobes exceed and then drop below a threshold. Range errors caused by receiver variations cancel since transmit and receive pulses are affected equally. The system exhibits range measurement accuracies on the order of 1-picosecond without calibration even when used with transmitted pulse widths on the order of 500 picoseconds. The system can provide sub-millimeter accurate TDR, laser and radar sensors for measuring tank fill levels or for precision radiolocation systems including digital handwriting capture.

16 Claims, 6 Drawing Sheets

PRECISION PULSE DETECTION SYSTEM FOR RADAR SENSORS

BACKGROUND OF THE INVENTION

1. Field of the Invention

The present invention relates to radar detection circuits and more particularly to baseband pulse detection circuits for expanded time electromagnetic ranging systems. The invention can be used to accurately detect the time of occurrence of pulses for impulse and pulsed radar, Time Domain Reflectometers (TDR), pulsed laser sensors and radiolocation systems.

2. Description of Related Art

Short range, high resolution pulse-echo ranging systems, such as impulse radar, TDR and pulsed laser rangefinders often transmit a sub-nanosecond wide pulse. Guided wave radars (GWR), also known as "electronic dipsticks" since they employ a single-wire electromagnetic guide wire, also often transmit a sub-nanosecond wide pulse and can be found in, for example, industrial pulse-echo TDR systems used to measure liquid levels in tanks. These systems usually operate in an expanded time mode, whereby a transmit pulse rate is slightly higher than a receive gate frequency, or sampling rate, to produce a stroboscopic effect in the form of a down-sampled, expanded-time signal.

The stroboscopic effect produces detected output pulses that resemble realtime sub-nanosecond pulses, but they occur on a vastly expanded time scale. Time expansion factors of 100,000 to 1-million are common. Accordingly, a 1-nanosecond wide realtime transmit pulse can produce a sampled output replica pulse having a 1-millisecond expanded time duration. At 1 ms duration, pulse detection and other processing is vastly easier. Examples of expanded time GWR architectures are disclosed in U.S. Pat. No. 5,609,059, "Electronic Multi-Purpose Material Level Sensor," by the present inventor, Thomas E. McEwan, and in U.S. Pat. No. 6,452,467, "Material Level Sensor Having a Wire-Horn Launcher," also by the present inventor. An example of an expanded time laser ranging system is disclosed in U.S. Pat. No. 5,767,953, "Light Beam Range Finder," by the present inventor. An example of an expanded time radar is disclosed in U.S. Pat. No. 6,137,438, "Precision Short-Range Pulse-Echo Systems with Automatic Pulse Detectors," to the present inventor.

High accuracy range determination depends on precisely detecting a time duration between a transmit pulse and a receive pulse. However, the transmit and receive pulses are often coupled to a receiver through different networks and thus may have different waveshapes. This makes precise range measurement extremely difficult, if not impossible. For example, a transmit pulse may be coupled to a receiver through a distortion-free coupler, while receive pulses may travel through, for example, an antenna, which can differentiate a pulse multiple times. Consequently, the transmit pulse waveform may consist of a single lobe of a half sinewave while the receive pulse waveform may have degenerated into several alternating polarity lobes. For high ranging precision, it is beneficial to detect the same point on transmit and receive pulse waveforms that have the same waveshape as they issue on a common line from the receiver. Preferably, this point is also independent of pulse amplitude variations, i.e., a zero axis crossing point.

One prior approach to the detection problem is a fixed threshold detector that triggers on the first pulse lobe to cross a threshold. Unfortunately, variations in received signal amplitude and pulse shape make this approach unattractive. In order to maintain 1-picosecond detection accuracy on an pulse having a 100 ps risetime, the detection point would need to be consistent to 1% of the pulse amplitude. Receive signals rarely have such consistency.

Another prior approach is time-of-peak (TOP) detection. U.S. Pat. No. 5,457,990, "Method and Apparatus for Determining a Fluid Level in the Vicinity of a Transmission Line," by Oswald et al, discloses the use of a threshold detector combined with a TOP detector. When a pulse exceeds a threshold, a TOP detector is enabled and the pulse peak is detected by differentiating the pulse and then detecting the zero-axis crossing of the derivative to find the exact time-of-peak. This approach, as disclosed in the '990 patent, has serious limitations. First, the transmit pulse has a substantially different shape, a monocycle shape, than the receive pulse, which has a "W" shape. Consistent, precision time-interval detection is difficult if not impossible between two different pulse shapes. Second, TOP detection itself has inherent limitations: (1) the peak region of a pulse has the slowest voltage rate of change and is therefore the most susceptible region on the pulse to noise, and (2) the peak region is the least accurate for range timing since it is nearly flat and a small voltage error can result in a large timing error upon detection.

Another prior approach has been disclosed in co-pending U.S. Patent Application Ser. No. 11/355,845, "Carrier Phase Detection System for Radar Sensors," filed on Feb. 16, 2006 by the present inventor filed on Feb. 16, 2006, now U.S. patent 7,379,016. This system operates by detecting the TOP of an expanded time RF burst envelope within an analysis window of time and then using that detection event to gate a carrier phase detector. The carrier phase detector detects the zero axis crossings of each sinewave cycle within a burst. A zero axis crossing of a selected cycle is gated by the TOP detection. Therefore, the accuracy of the detection is directly tied to the selected sinewave zero axis crossing, which is highly accurate, and not to the TOP detection accuracy. Limitations to this approach include: (1) the requirement for an envelope detector to detect an envelope of a plurality of detected cycles, i.e., a multi-cycle sinusoidal burst, and (2) changes in envelope shape due to target characteristics can produce jumps to another cycle within the burst, resulting in large errors.

Prior pulse detection approaches present hurdles to ranging precision on the order of 1 ps, particularly when transmitting and receiving mono-lobe or monocycle pulses having a duration of, for example 0.1 to 1 ns. Thus, a new pulse detector is needed.

SUMMARY OF THE INVENTION

The invention is a pulse detector for an electromagnetic ranging system, which can include: (1) a transceiver for transmitting and receiving pulses and for producing a detected pulse; (2) a threshold detector for producing a threshold pulse when the detected pulse exceeds a threshold level; (3) an window generator responsive to the threshold pulse for producing an analysis window pulse; (4) a zero crossing detector for producing a trigger pulse when the detected pulse crosses the zero axis; and (5) a latch responsive to the trigger pulse during the analysis window pulse for producing a range measurement pulse. The detector can further include a gate for gating the analysis window pulse with a gate signal for producing a gated window pulse, wherein the latch is responsive to the trigger pulse during the gated window pulse. The transceiver can be a radar or laser transceiver for transmitting and receiving pulses and for producing a detected pulse. The transceiver can also be a TDR transceiver for transmitting pulses and receiving echo pulses on a transmission line immersed in a liquid or in proximal contact with a material for producing a detected pulse. Furthermore, the transceiver can also be a radiolocation transceiver for transmitting and receiving pulses and for producing a detected pulse. The radiolocation transceiver can also include a transmitter for transmitting pulses and a plurality of receivers for producing a plurality of detected radiolocation pulses; or it can be include a plurality of transmitters, each sequentially transmitting pulses, and a receiver for producing a plurality of sequentially detected radiolocation pulses. The detector can also include a processor responsive to the range measurement pulse and a reference pulse for producing a range measurement output, wherein the range measurement output can be a PWM pulse having a width proportional to range.

A further aspect of the invention is a pulse detector for an electromagnetic ranging system that includes: (1) a transceiver for transmitting and receiving pulses and for producing a detected reference pulse and a detected range pulse; (2) a reference threshold detector for producing a reference threshold pulse when the reference pulse exceeds a threshold level; (3) a reference window generator responsive to the reference threshold pulse for producing a reference analysis window pulse; (4) a zero crossing reference detector for producing a reference trigger pulse when the detected reference pulse crosses the zero axis; (5) a reference latch responsive to the reference trigger pulse during the reference analysis window pulse for producing a reference output pulse; (6) a range threshold detector for producing a range threshold pulse when the detected range pulse exceeds a threshold level; (7) a range window generator responsive to the range threshold pulse for producing a range analysis window pulse; (8) a zero crossing range detector for producing a range trigger pulse when the detected range pulse crosses the zero axis; and (9) a range latch responsive to the range trigger pulse during the range analysis window pulse for producing a range output pulse. The pulse detector can include a gate for gating the range analysis window pulse with a gate signal produced by a delayed reference output pulse and for producing a gated range window pulse, wherein the range latch is responsive to the range trigger pulse during the gated range window pulse. The transceiver can be a radar or laser transceiver for transmitting and receiving pulses and for producing a detected reference pulse and a detected range pulse. The transceiver can also be a TDR transceiver for transmitting pulses and receiving range pulses on a transmission line immersed in a liquid or in proximal contact with a material for producing a detected reference pulse and a detected range pulse, or the transceiver can be a TDR transceiver for transmitting realtime pulses having a single lobe on a transmission line immersed in a liquid or in proximal contact with a material, and for producing expanded time detected reference and range pulses, each having two or more lobes.

The present invention can be used in expanded time radar, laser, TDR and radiolocation ranging systems as a detection system that exhibits high accuracy, high dynamic range and excellent immunity to noise. Applications include, but are not limited to, pulse echo radar and laser rangefinders for tank fill level measurement, environmental monitoring, industrial and robotic controls, imaging radars, vehicle backup and collision warning, and universal object detection and ranging. TDR applications include, but are not limited to, industrial tank and vat fill level sensing, automotive fuel tank fill level sensing, river level sensing, and hydraulic piston position sensing. Radiolocation applications can include digital handwriting pen location, robotic and general object location, and digital surgery.

One object of the present invention is to provide a precision pulse detection system for pulsed radar, TDR and laser ranging systems. A further object is to provide a precision pulse detection system for pulsed RF radar with high immunity to noise, interference and baseline clutter. Another object of the present invention is to provide a precision pulse detection system for TDR systems transmitting mono-lobe pulses.

DETAILED DESCRIPTION OF THE INVENTION

A detailed description of the present invention is provided below with reference to the figures. While illustrative component values and circuit parameters are given, other embodiments can be constructed with other component values and circuit parameters.

General Description

The present invention overcomes the limitations of the various prior detection techniques by detecting a selected zero axis crossing of an expanded time pulse. The selected zero axis crossing is detected immediately after a pulse lobe crosses above and then falls below a threshold and subsequently crosses the zero axis, which is the detection point. The threshold crossings are a precondition to zero axis crossing detection, thereby eliminating false triggering on sub-threshold noise. The accuracy of detection can be extremely high since the zero point is amplitude independent and often exhibits the highest voltage rate of change. Furthermore, a point where the voltage rate of change is highest is also the point of greatest immunity to noise. Noise can include random thermal noise, RF interference, and baseline clutter from unwanted echoes.

This preconditioned zero axis detection arrangement is highly accurate in itself. However, in any ranging system accurate detection of both a reference pulse and a range pulse is needed to trigger, respectively, start and stop inputs to a range counter. In contrast, systems having limited accuracy often employ a reset signal or a clock-derived signal to start the range counter and then a detected echo to stop the counter. This approach can exhibit large errors and drift since timing skews in the transmitter and receiver are included in the measurement.

One embodiment of the present invention eliminates timing skews by detecting a transmit pulse, or other reference pulse, and an echo, or range, pulse as these pulses issue sequentially from a receiver. Timing skews identically affect both the reference and the range pulses, so the time interval between them remains precisely constant. For high precision, it is necessary to accurately detect both the reference and the range pulses, which may have differing amplitudes. Accordingly, the present invention employs zero axis detection for amplitude independence.

Specific Description

Figure 1:
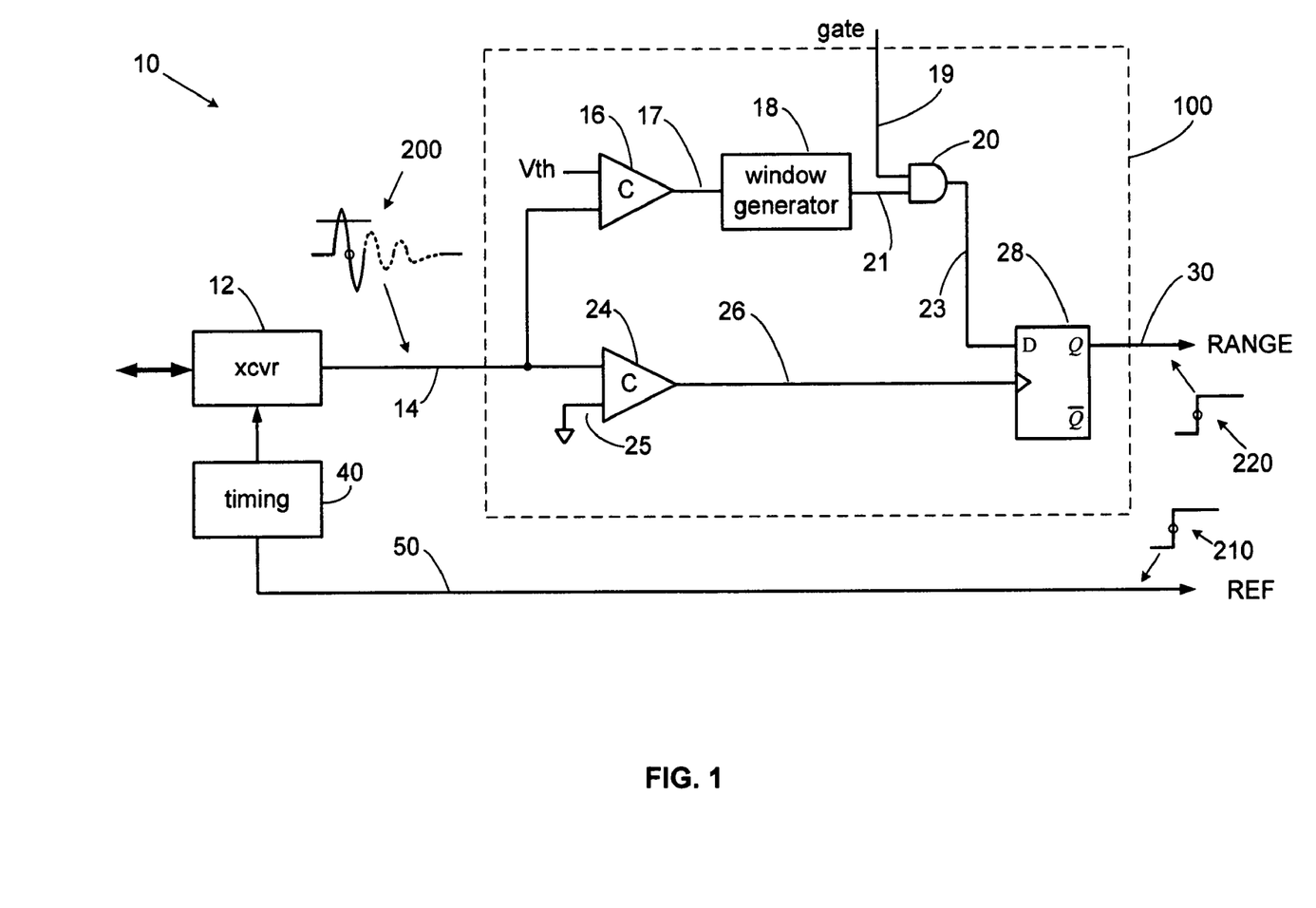
FIG. 1 is a block diagram of a precision pulse detector of the present invention.

Turning now to the drawings, FIG. 1 is a block diagram of a precision pulse detector, generally 10. Transceiver 12 transmits pulses and receives echo, or range, pulses in response to a timing control circuit 40. The transmit pulse rate can be on the order of 10 kHz to 100 MHz. Transceiver 12 is a transmitter-receiver and can be a monostatic, bistatic or multistatic transmitter-receiver. The receiver portion of transceiver 12 operates by taking samples in response to timing circuit 40. The sample rate can be a slightly lower rate than the transmit pulse rate to produce a stroboscopic expanded time output. An exemplary receiver output pulse 200 can often have an expanded time period of 1-millisecond while its corresponding realtime input pulse can have a 1-nanosecond period. Pulse 200 is a received expanded time pulse. The expanded time pulses can repeat at a rate on the order of 1-1000 times per second, i.e., at the sweep rate. For clarity, one sweep of the range gate, i.e., the sampling point in time, can produce one expanded time pulse or pulse set, which may include, for example, a transmit, or reference pulse, and an echo, or range, pulse. Often, multiple range pulses can occur due to clutter or multiple targets. For simplicity of the examples herein, only one range pulse is considered, although it is readily possible to configure the detector of the present invention to handle multiple echoes.

Zero crossing comparator 24 compares output pulse 200 from transceiver 12 on line 14 to zero, i.e., ground, and produces a zero crossing pulse, which can be termed a trigger pulse, on line 26 whenever a pulse on line 14 crosses the zero axis. It should be understood that the term "zero" in this context can also refer to an arbitrary reference voltage. One such reference for single power rail systems is the rail mid-voltage. Accordingly, line 25 may be connected to another reference instead of ground as shown in FIG. 1. Zero axis crossing comparator 24 can also be referred to as zero axis crossing threshold detector 24, since comparator 24 operates as a threshold detector with its reference level generally set to zero.

Zero crossing comparator 24 compares output pulse 200 from transceiver 12 on line 14 to zero, i.e., ground, and produces a zero crossing pulse, which can be termed a trigger pulse, on line 26 whenever a pulse on line 14 crosses the zero axis. It should be understood that the term "zero" in this context can also refer to an arbitrary reference voltage. One such reference for single power rail systems is the rail mid-voltage. Accordingly, line 25 may be connected to another reference instead of ground as shown in FIG. 1.

Latch 28 outputs a range pulse on line 30 when it receives a trigger pulse on line 26 during the time that a gated window pulse is applied to its D input. The requirement to toggle latch 28 only during the time that a gated window pulse is present prevents latch 28 from toggling on baseline noise. Elements 16, 18, 20 (optional), 24 and 28, which lie inside dashed box 100, comprise a precision pulse detector.

Range measurements require a start reference pulse 210, labeled REF, and a range pulse 220, labeled RANGE. The REF pulse of FIG. 1 is derived from the timing system. It can be, for example, a start-of-sweep reset pulse or a pulse derived from the timing circuit 40. Such a reference is often simple to derive but often does not yield high ranging precision.

Figure 2A:
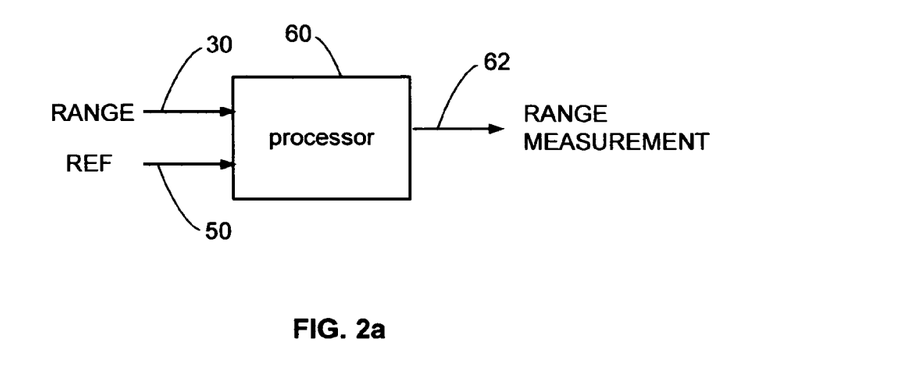
FIG. 2a diagrams a processor for use with the precision pulse detector.

FIG. 2a depicts optional processor 60 which receives REF and RANGE pulses on lines 50 and 30 respectively. The processor can convert the REF to RANGE time difference to distance and can apply other processing such as averaging, scaling, memory, etc. The processor outputs on line 62, which can be a bus, to a readout, a controller, or other function.

Figure 2B:
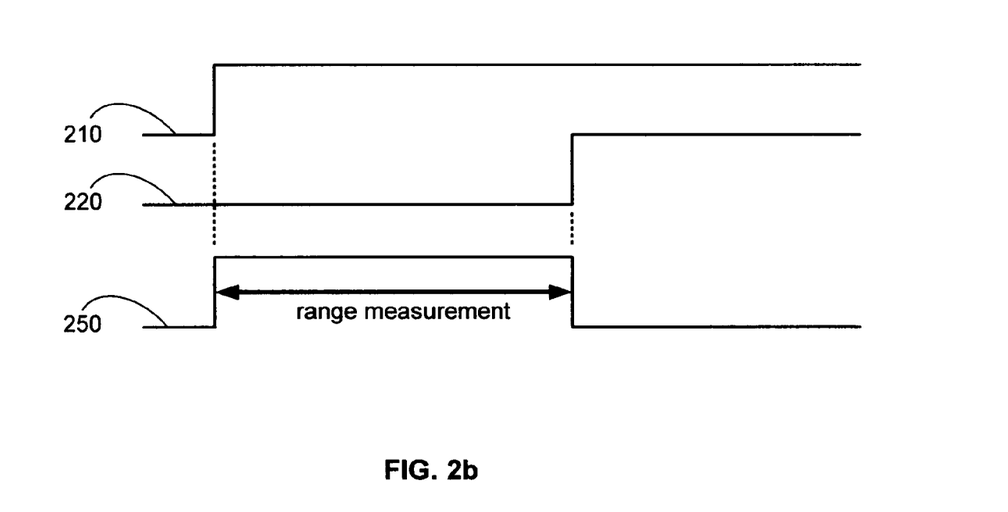
FIG. 2b depicts range measurement waveforms.

FIG. 2b shows example timing relations between REF pulse 210 and RANGE pulse 220. A range measurement can be made from the time difference between these two pulses. Pulse 250 is a pulse width modulation (PWM) pulse having a width proportional to range. The PWM pulse can be output from processor 60 on line 62.

Figure 3:
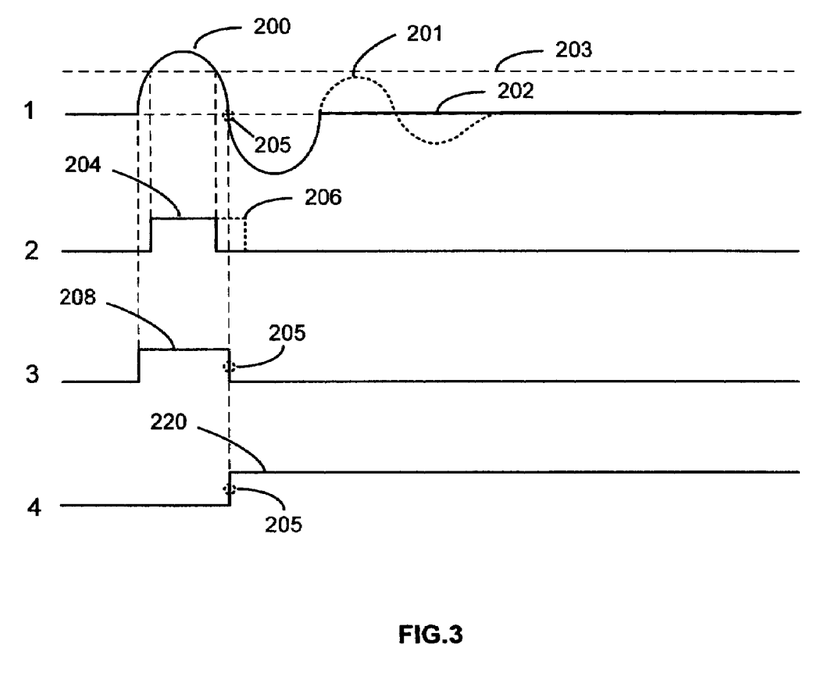
FIG. 3 is a waveform diagram for the system of FIG. 1.

FIG. 3 is a timing diagram for the detection system of FIG. 1. The traces are numbered at the left. Trace 1 depicts an exemplary detected pulse 200 from transceiver 12 on line 14 that includes at least one positive lobe and one negative lobe. Additional trailing lobes, as indicated by dashed waveform 201, may occur but can be ignored. Impulse radar, TDR and laser systems can produce monocycles, e.g., pulse 200 without the dotted lobes, whereas high bandwidth pulsed RF radars often produce one or more trailing lobes 201. Routine logic control circuitry can prevent latch 28 of FIG. 1 from retriggering on trailing lobes or other pulses, e.g., radar clutter. Latch 28 triggers, i.e., changes state, once per radar range sweep and triggers on an edge of pulse 208. Trace 2 shows the output on line 17 of threshold comparator 16, which produces a threshold pulse 204 whenever pulse 200 crosses a threshold level 203, set by voltage Vth, which is the reference for comparator 16. Window generator 18 produces pulse 206 on line 21 in response to pulse 204. Pulse 206 can be formed by stretching or delaying pulse 204 using, for example, a resistor-capacitor network coupled to a logic buffer, or it can be stretched using a monostable multivibrator or a resettable latch. Window pulse 206 may include pulse 204 so its duration is the combined duration of pulse 204 and pulse 206, or it may simply include the duration of pulse 206, as indicate by a dotted line that begins at the end of pulse 204. After passing through gate 20, pulse 206 appears on line 23 and is applied to the D-input of latch 28 if gate line 19 is high. Trace 3 depicts the output of zero crossing comparator 24 on line 26, which produces a pulse 208 whenever pulse 200 is above zero axis 202. When pulse 208 drops low, at the zero axis crossing of pulse 200, and when window pulse 206 is high at the D-input, then latch 28 triggers and produces a RANGE output 220 on line 30, as shown in trace 4.

Whether the width of pulse 206 includes the width of pulse 204 is generally unimportant. Window pulse 206 must span zero axis crossing point 205, which is the detection point, in order to enable a detection output from latch 28. Detection point 205 is also indicated at the end of threshold pulse 208 and at the start of RANGE pulse 220. The detection point is independent of the amplitude of pulse 200.

Figure 4:
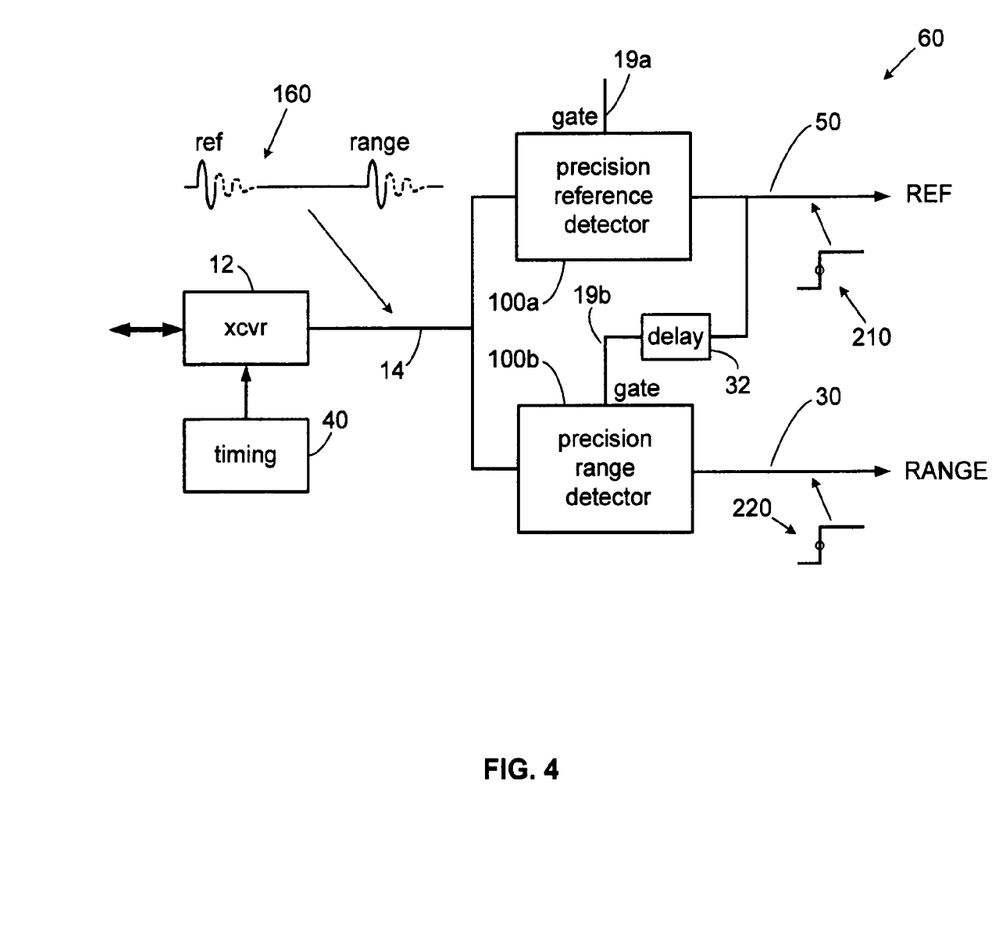
FIG. 4 is a block diagram of a precision differential pulse detector.
Figure 5:
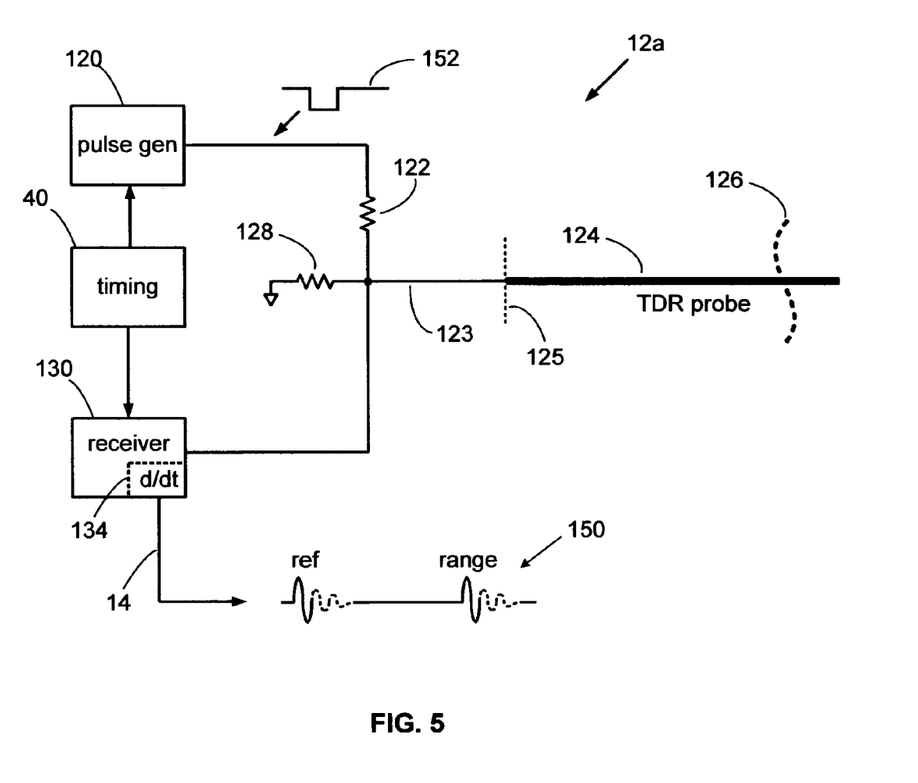
FIG. 5 is a block diagram of a TDR transceiver.

FIG. 4 is a block diagram of a differential detector configuration, generally 60, employing two precision detectors 100, referenced as 100a and 100b, in a time differencing configuration. A benefit to the differential configuration is timing variations in transceiver 12 affect both the reference and range detection times equally and thus differentially subtract out of the range measurement. Accordingly, realtime offset errors of less than 1-picosecond, or 0.15 mm in radar range, can be realized without recourse to calibration.

Transceiver 12 outputs a pulse sequence on line 14 that contains both an expanded time reference pulse and an expanded time range pulse, as indicated by waveform 160. Timing circuit 40 can be set to sweep over a range that includes the reference pulse. In contrast, the timing circuit 40 of FIG. 1 need not necessarily sweep over such a range. The reference pulse can be the transmit pulse, often called the "main bang" in radar parlance, or it can be a reflection pulse such as an antenna reflection or a discontinuity reflection at the top of a TDR "electronic dipstick" probe. The temporal location of the reference pulse defines the physical start of the range measurement.

Pulses 160 on line 14 are input to a precision reference detector 100a, which detects the reference pulse zero axis crossing and outputs a REF pulse on line 50. Elements 100a and 100b contain the same elements and perform in the same way as element 100 of FIG. 1. However, zero crossing comparator 24 may serve both elements 100a and 100b, rather than using separate comparators. Similarly, threshold comparators 16 in each of boxes 100a and 100b can be formed by just one comparator so that the threshold for both the reference and the range pulses can be the same. Pulses 160 are also input to a precision range detector 100b, which detects the range pulse zero axis crossing and outputs a RANGE pulse on line 30. Gate input line 19a to detector 100a can be optional or can carry a gate signal used to enable or disable the entire detector system 60. Gate input line 19b, in this example, carries a delayed REF pulse from line 50 via delay element 32. This gate input prevents range detector 100b from triggering before detector 100a triggers. The delay provided by element 32 can also be set to prevent range detector 100b from triggering on close-in clutter. The REF and RANGE pulses can be input to processor 60 to produce a range measurement.

A precision detector prototype was tested using a National Instruments LM339comparators for elements 16 and 24, a resistor-capacitor-diode network for elements 18 and 20, and a Fairchild 74HC74 D-input flip-flop for element 28. Transmit pulse 152 was set relatively very wide, e.g., about 500ps wide. Such wide TDR pulses are often preferred in industrial tank fill level measurements since wide pulses can integrate over contaminants clinging to the probe. The prototype exhibited a REF to RANGE interval stability of 1-picosecond over a temperature range of −55 to +65 degrees C. The prototype was configured differentially according to FIG. 4 using the TDR transceiver 12a with a metal reflector at 1-meter on a coaxial probe. Timing circuit 40 was built according to co-pending U.S. patent application Ser. No. 11/343,049, "Rate Locked Loop Radar Timing Circuit," filed on Jan. 30, 2006 by the present inventor filed Jan. 30, 2006. A stability of 1-picosecond is quite remarkable considering comparators 16 and 24 were embodied by 1975 vintage low bandwidth analog integrated circuits having nearly 1-million times lower bandwidth than what would be required of a realtime circuit. The test data confirm the efficacy of the present invention. High precision is readily achieved since comparator input offset voltages are low compared to pulse amplitudes, and comparator propagation delay versus overdrive is minimal in an expanded time system.

A precision detector prototype was tested using a National Instruments LM339 comparators for elements 16 and 24, a resistor-capacitor-diode network for elements 18 and 20, and a Fairchild 74 HC74D-input flip-flop for element 28. Transmit pulse 152 was set relatively very wide, e.g., about 500 ps wide. Such wide TDR pulses are often preferred in industrial tank fill level measurements since wide pulses can integrate over contaminants clinging to the probe. The prototype exhibited a REF to RANGE interval stability of 1-picosecond over a temperature range of −55to +65 degrees C. The prototype was configured differentially according to FIG. 4 using the TDR transceiver 12a with a metal reflector at 1-meter on a coaxial probe. Timing circuit 40 was built according to co-pending U.S. patent application Ser. No. 11/343049, "Rate Locked Loop Radar Timing Circuit," filed on Jan.30, 2006 by the present inventor. A stability of 1-picosecond is quite remarkable considering comparators 16 and 24 were embodied by 1975 vintage low bandwidth analog integrated circuits having nearly 1-million times lower bandwidth than what would be required of a realtime circuit. The test data confirm the efficacy of the present invention. High precision is readily achieved since comparator input offset voltages are low compared to pulse amplitudes, and comparator propagation delay versus overdrive is minimal in an expanded time system.

Figure 6A:
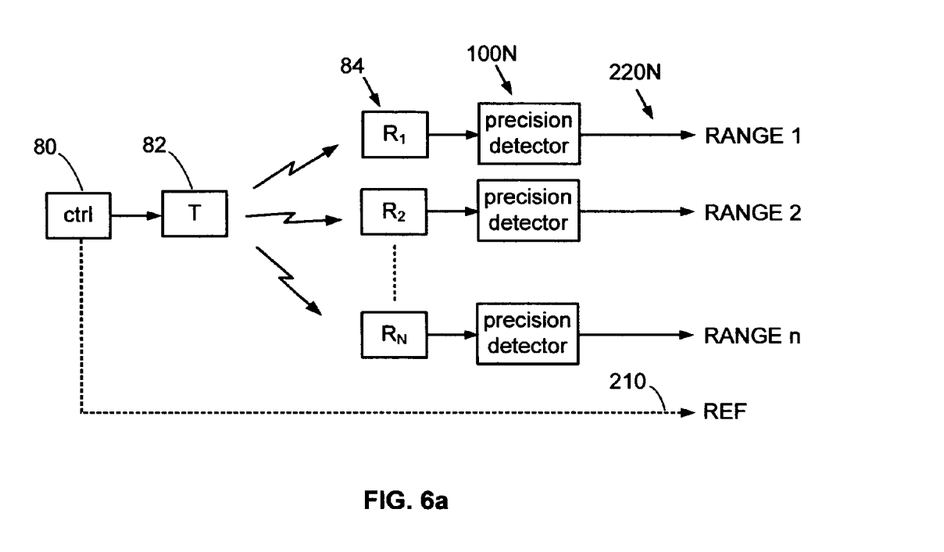
FIG. 6a is a block diagram of a plurality of precision pulse detectors in a radiolocation system.
Figure 6B:
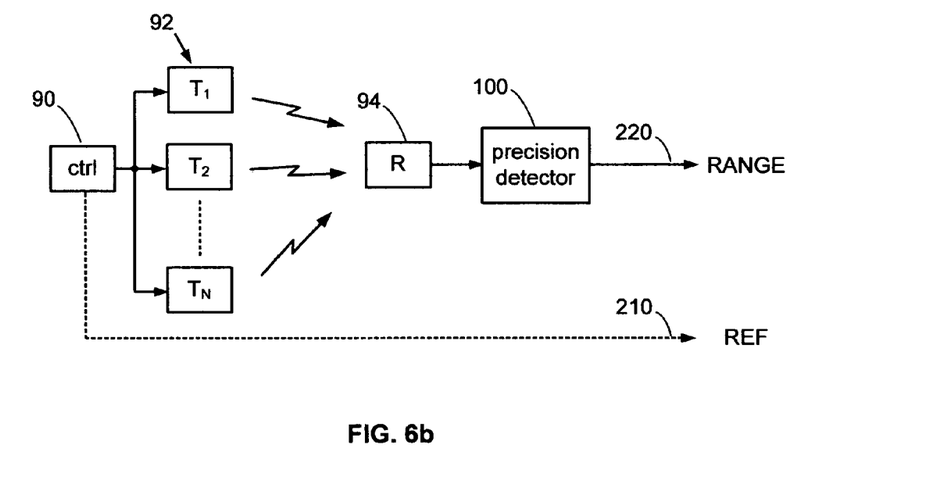
FIG. 6b is a block diagram of precision pulse detector in a multi-transmitter radiolocation system.

FIGS. 6a and 6b are block diagrams of precision detectors 100 with transceivers used for radiolocation. FIG. 6a includes a controller 80 coupled to a transmitter 82 which transmits electromagnetic pulses to a plurality of N receivers 84. Receivers 84 are coupled to a plurality of precision detectors 100N, each of which detect pulses as described with reference to FIG. 1 and output a plurality of N RANGE pulses on a plurality of lines 220N. Controller 80 contains timing circuitry and can output an optional reference pulse, labeled REF, on line 210. The physical location of transmitter 82 can be determined by time-of-flight range information between the REF and RANGE pulses, or by time-of-arrival information using one of the RANGE pulses, e.g., RANGE 1, as a reference pulse.

FIG. 6b includes a plurality of N transmitters 92 which transmit a plurality of sequential or multiplexed signals to receiver 94. Receiver 94 sequentially outputs range pulses to precision detector 100, which operates as described with reference to FIG. 1 and which outputs N sequential RANGE pulses on line 220. Controller 90 provides timing to the transmitters and can optionally provide a reference pulse, labeled REF, on line 210. Control circuitry to set which transmitter is active at a particular time is not shown for simplicity in this example. The location of receiver 94 can be computed by time-of-flight range information between the REF and RANGE pulses, or by time-of-arrival information using one of the RANGE pulses, e.g., RANGE 1, as a reference pulse. RANGE 1, RANGE2, . . . RANGE N pulses appear sequentially on line 220.

The use of the word "radar" herein refers to electromagnetic radar that employs microwaves or millimeter waves, and it also refers to optical radar, i.e., laser rangefinders, as well as guided wave radar, wherein radar pulses are guided along a electromagnetic guide wire or other conductor, as in TDR. "Radar" includes monostatic, bistatic and multistatic systems, as well as radars having a single antenna/transducer. A multistatic radar can also include, for example, a handwriting acquisition pen based on time-of-flight or time-of-arrival signals using multiple antennas to determine pen location, as disclosed in, for example, U.S. Pat. No. 6,747,599,"Radiolocation System Having Writing Pen Application," to the present inventor. The term pulse can refer to a single lobe pulse, e.g., an impulse, or a pulse having two lobes, i.e., a positive and a negative lobe forming a monocycle, or other transient waveforms, such as damped sinewaves. It can also refer to a step-like pulse or a pulse edge. The terms transceiver, receiver, and transmitter can also include their associated radiating or conducting elements, e.g., antennas, lenses, photoemitters and detectors, and TDR probes. Swept timing, or range sweep refers to sweeps of a receive gate, or a sampling gate, over a range of delays. During one complete sweep, a large number of realtime pulses are often transmitted and received, and often integrated in the receiver, while often only one detected transmit and one detected echo, or range pulse is produced in expanded time by the gated, sampling receiver; this occurring as a result of down-sampling, expanded time operation. A pulsed RF radar, a laser, a TDR or a radiolocation system can transmit RF sinusoids that can include a pulse burst having a plurality of sinusoids. A detector converts an analog pulse signal into a digital timing signal which can be used to trigger a range counter, for example. A latch can be a flip-flip, a flag, or a memory element.

Changes and modifications in the specifically described embodiments can be carried out without departing from the scope of the invention which is intended to be limited only by the scope of the appended claims.

What is claimed is:

1. A pulse detection system for an electromagnetic ranging system, comprising:
a transceiver for transmitting and receiving pulses and for producing a detected pulse;
a threshold detector for producing a threshold pulse when the detected pulse exceeds a threshold level;
an window generator responsive to the threshold pulse for producing a window pulse;
a zero crossing threshold detector for producing a trigger pulse when the detected pulse crosses the zero axis; and
a latch responsive to the trigger pulse during the window pulse for producing a range measurement pulse.

2. The detector of claim 1 further comprising a gate for gating the window pulse with a gate signal for producing a gated window pulse, wherein the latch is responsive to the trigger pulse during the gated window pulse.

3. The detector of claim 1 wherein the transceiver is a radar or laser transceiver for transmitting and receiving pulses and for producing a detected pulse.

4. The detector of claim 1 wherein the transceiver is a TDR transceiver for transmitting and receiving pulses on a transmission line that is inserted to a liquid or a material and for producing a detected pulse having two or more lobes.

5. The detector of claim 1 wherein the transceiver is a radiolocation transceiver for transmitting and receiving pulses and for producing a detected pulse.

6. The detector of claim 5 wherein the radiolocation transceiver further comprises a transmitter for transmitting pulses and a plurality of receivers for producing a plurality of detected radiolocation pulses.

7. The detector of claim 5 wherein the radiolocation transceiver further comprises a plurality of transmitters, each sequentially transmitting pulses, and a receiver for producing a plurality of sequentially detected radiolocation pulses.

8. The detector of claim 1 further comprising a processor responsive to the range measurement pulse and to a reference pulse for producing a range measurement output.

9. The detector of claim 8 wherein the range measurement output is a PWM pulse having a width proportional to range.

10. A pulse detection system for an electromagnetic ranging system, comprising:
a transceiver for transmitting and receiving pulses and for producing a detected reference pulse and a detected range pulse;
a reference threshold detector for producing a reference threshold pulse when the reference pulse exceeds a threshold level;
a reference window generator responsive to the reference threshold pulse for producing a reference window pulse;
one or more zero crossing threshold detectors for producing a reference trigger pulse when the detected reference pulse crosses the zero axis and for producing a range trigger pulse when the detected range pulse crosses the zero axis;
a reference latch responsive to the reference trigger pulse during the reference window pulse for producing a reference output pulse;
a range threshold detector for producing a range threshold pulse when the detected range pulse exceeds a threshold level;
a range window generator responsive to the range threshold pulse for producing a range window pulse; and
a range latch responsive to the range trigger pulse during the range window pulse for producing a range output pulse.

11. The pulse detector of claim 10 further comprising a gate for gating the range window pulse with a gate signal produced by a delayed reference output pulse and for producing a gated range window pulse, wherein the range latch is responsive to the range trigger pulse during the gated range window pulse.

12. The detector of claim 10 wherein the transceiver is a radar or laser transceiver for transmitting and receiving pulses and for producing a detected reference pulse and a detected range pulse.

13. The detector of claim 10 wherein the transceiver is a TDR transceiver for transmitting and receiving pulses on a transmission line in intimate or proximal contact with a liquid or a material and for producing a detected reference pulse and a detected range pulse, each having two or more lobes.

14. A method of precisely detecting pulses, comprising:
transmitting and receiving realtime pulses for producing a received pulse that is expanded in time;
threshold detecting the received pulse for producing a threshold pulse;
producing a window pulse in response to the threshold pulse;
producing a zero crossing pulse when the received expanded time pulse crosses the zero axis; and
triggering a latch when the zero crossing pulse occurs during the window pulse.

15. A method of precisely detecting pulses, comprising:
transmitting and receiving realtime pulses for producing a reference pulse that is expanded in time and a range pulse that is expanded in time;
threshold detecting the reference pulse for producing a reference threshold pulse;
threshold detecting the range pulse for producing a range threshold pulse;
producing a reference window pulse in response to the reference threshold pulse;
producing a range window pulse in response to the range threshold pulse;
producing a zero crossing pulse when the reference pulse crosses the zero axis and when the range pulse crosses the zero axis;
triggering a reference latch when a zero crossing pulse occurs during the reference window pulse for producing a reference latch pulse; and
triggering a range latch when a zero crossing pulse occurs during the range window pulse for producing a range latch pulse.

16. The method of claim 15 further comprising measuring range from the time duration between the reference latch pulse and the range latch pulse.

* * * * *